(12) United States Patent
Keating

(10) Patent No.: US 8,505,705 B2
(45) Date of Patent: Aug. 13, 2013

(54) STAMPED LAMINATED STACKS FOR PARKING PAWL, PARKING GEAR AND PARKING ANCHOR

(75) Inventor: Martin P. Keating, Plainfield, IL (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 13/509,278

(22) PCT Filed: Dec. 16, 2010

(86) PCT No.: PCT/US2010/060664
§ 371 (c)(1),
(2), (4) Date: May 10, 2012

(87) PCT Pub. No.: WO2011/090614
PCT Pub. Date: Jul. 28, 2011

(65) Prior Publication Data
US 2012/0325615 A1    Dec. 27, 2012

Related U.S. Application Data

(60) Provisional application No. 61/291,275, filed on Dec. 30, 2009.

(51) Int. Cl.
*F16D 65/02* (2006.01)
*F16D 65/14* (2006.01)
*F16H 63/34* (2006.01)

(52) U.S. Cl.
USPC ................................. 192/219.5; 74/577 S

(58) Field of Classification Search
USPC .................. 192/219.4, 219.5, 219.6
See application file for complete search history.

(56) References Cited

U.S. PATENT DOCUMENTS

| 1,836,439 A | | 1/1929 | Buehler |
| 2,974,752 A | | 3/1961 | Howard |
| 3,300,001 A | * | 1/1967 | Stockton .................. 192/219.5 |

(Continued)

FOREIGN PATENT DOCUMENTS

| JP | 57-006153 A | 1/1982 |
| JP | 61-147656 U | 9/1986 |
| JP | 2003-276581 A | 10/2003 |

OTHER PUBLICATIONS

WO 2011/090614 International Search Report (pp. 1-4).

*Primary Examiner* — David D Le
*Assistant Examiner* — Mark Manley
(74) *Attorney, Agent, or Firm* — Helmholdt Law PLC; Thomas D. Helmhodt

(57) ABSTRACT

A parking brake (10) for a transmission (12) of a motorized vehicle (14). An anchor (24) is located to support an actuator (26) interposed between the anchor (24) and a parking pawl (22) when the parking pawl (22) is in the engaged position with a toothed parking gear (20). The anchor (24) is defined by a plurality of stacked laminas (30). Each of the plurality of stacked laminas (30) is rigid and has at least one peripherally extending surface (32), wherein the at least one peripherally extending surface (32) of at least two of the plurality of stacked laminas cooperate to define at least one load-bearing surface (34), and wherein the plurality of stacked laminas (30) are secured together to prevent relative movement of any one of the plurality of stacked laminas (30) with respect to another of the plurality of stacked laminas (30) when a load is transmitted through the parking pawl (22) from the at least one load-bearing surface (34).

13 Claims, 3 Drawing Sheets

(56) References Cited

U.S. PATENT DOCUMENTS

| | | | |
|---|---|---|---|
| 4,223,768 A | 9/1980 | Iwanaga | |
| 4,576,261 A | 3/1986 | Barr | |
| 4,667,783 A | 5/1987 | Sugano et al. | |
| 4,671,133 A | 6/1987 | Yamada | |
| 4,722,427 A | 2/1988 | Prumbaum et al. | |
| 5,337,626 A | 8/1994 | Everts et al. | |
| 5,685,406 A | 11/1997 | Crum et al. | |
| 5,807,205 A | 9/1998 | Odaka et al. | |
| 5,934,436 A | 8/1999 | Raszkowski et al. | |
| 5,972,476 A | 10/1999 | Field | |
| 5,983,757 A * | 11/1999 | Blise et al. | 81/57.39 |
| 6,065,581 A | 5/2000 | Nogle | |
| 6,290,047 B1 | 9/2001 | Adamczyk et al. | |
| 6,575,279 B2 * | 6/2003 | Quigley | 192/46 |
| 7,556,135 B2 | 7/2009 | Kasuya | |
| 2001/0015558 A1* | 8/2001 | Fisher et al. | 292/216 |
| 2007/0062780 A1* | 3/2007 | Kusamoto et al. | 192/219.5 |
| 2007/0193847 A1 | 8/2007 | Keating et al. | |
| 2008/0314713 A1 | 12/2008 | Vogele et al. | |

* cited by examiner

STAMPED LAMINATED STACKS FOR PARKING PAWL, PARKING GEAR AND PARKING ANCHOR

FIELD OF THE INVENTION

The invention relates to a transmission that receives rotary input torque from a power source and transmits the torque to an output load, combined with a brake to retard or stop rotation of the output load, and more particularly, to an automobile or other mechanism for transporting passengers or cargo where the power source includes an internal combustion engine, electric motor, or other power plant to propel the mechanism, and where the brake retards or stops movement of the transmission of the vehicle and is influenced by a controller of the transmission for transmitting torque, including structure to hold the brake in an engaged condition even if the vehicle is unattended, where the brake includes a pivoting projection that engages a toothed wheel.

BACKGROUND

Parking brake assemblies are used in automotive vehicles to operatively engage the parking gear of a vehicle, thereby maintaining the vehicle in a parked position or state. Parking brake assemblies typically include a rotatable member or a parking pawl, which is selectively engaged by the actuator of the vehicle when the transmission of the vehicle is shifted into the parked position. When the actuator engages the parking pawl, the parking pawl pivots or rotates into a position to locate a portion of the parking pawl between a pair of teeth on the parking gear to substantially prevent further rotation of the parking gear and the output shaft. A return spring is typically connected to the parking pawl and causes the parking pawl to disengage from the parking gear when the actuator is retracted, i.e., when the vehicle is shifted out of the parked position. Parking brakes for automatic transmissions are generally known in the art. For example, see U.S. Pat. Nos. 2,974,752; 4,223,768; 4,576,261; 4,667,783; 4,671,133; 4,722,427; 5,685,406; 5,807,205; 5,934,436; 6,065,581; 6,290,047; and 7,556,135. Various component parts of a parking brake assembly are typically manufactured from large stock or castings requiring extensive machining operations to finish the blank into a final form of the desired part. Laminated gears are generally known in the art. For example, see U.S. Pat. Nos. 1,836,439; and 5,337,626. Laminated parking pawls are generally known in the art. For example, see FIG. 5 of U.S. Pat. No. 5,972,476. While each of these devices is generally suitable to perform the intended function, the component parts manufactured from large stock or castings for a parking brake assembly are expensive to manufacture due to the large amount of machining required to finish the blank into a final form of the desired part.

SUMMARY

It would be desirable to provide a parking pawl, a parking gear, and a parking anchor to be assembled into a parking brake assembly manufactured in an efficient and cost effective manner to achieve the close dimensional tolerance needed for these parts. It would be desirable to produce individual parts for a parking brake assembly that can be manufactured without heat treating and/or annealing when stamped from the appropriate material. It would be desirable if the individual parts for a parking brake assembly produced were suitable for use in a vehicle, specifically an automotive, or ATV type transmission. Movable die tooling devices and methods can be used to produce a stamped stack to achieve the chamfered edges and geometry needed. The laminas can be stacked and held together with interference fit projections and recesses, rivets, and/or welded joining methods.

A combination of load-transmitting laminated parts or assembly of parts can include each part having at least two peripherally extending surfaces foamed by stamping a plurality of thin laminas from planar stock material. The laminas can be stacked together, such that the peripherally extending surfaces of the adjacent laminas cooperate to define a load-bearing surface of the part. The layers of stacked laminas can be permanently secured together to prevent movement when a load is transmitted from one of the load-bearing peripherally extending surfaces to another load-bearing peripherally extending surface.

In a parking brake for a transmission of a motorized vehicle for transporting passengers and/or cargo, the transmission receives rotary input torque from a power source and transmits the rotary input torque to an output load to propel the vehicle. The parking brake stops rotation of the output load and prevents movement of the vehicle, even if the vehicle is unattended. The parking brake includes an actuator capable of movement between a first position and a second position, a toothed parking gear connected to the output load and having an axis of rotation, and a pivotable parking pawl engageable with the toothed parking gear for stopping rotational motion of the output load in an engaged position. The pivotable parking pawl is rotatable with respect to a pivot axis in response to movement of the actuator between the first position and the second position. The parking pawl is pivotable between a disengaged position spaced from the toothed parking gear and an engaged position contacting the toothed parking gear. An anchor is located to support the actuator, with the actuator interposed between the anchor and the parking pawl when the parking pawl is in the engaged position with the toothed parking gear. The anchor is defined by a plurality of stacked laminas. Each of the plurality of stacked laminas is rigid and has at least one peripherally extending surface. The at least one peripherally extending surface of at least two of the plurality of stacked laminas cooperate to define at least one load-bearing surface. The plurality of stacked laminas are secured together to prevent relative movement of any one of the plurality of stacked laminas with respect to another of the plurality of stacked laminas when a load is transmitted through the parking pawl from the at least one load-bearing surface.

At least one of the plurality of stacked laminas defining the parking anchor can have a different peripheral contour defining at least one chamfered load-bearing surface on the parking anchor. The at least one chamfered load-bearing surface on the parking anchor faces the actuator for engagement with the actuator during movement between the first position and the second position.

The toothed parking gear can be connected to the output load and has an axis of rotation. The toothed parking gear can be defined by a plurality of stacked laminas. Each of the plurality of stacked laminas can be rigid and have at least one peripherally extending surface. The at least one peripherally extending surface of at least two of the plurality of stacked laminas can cooperate to define at least one load-bearing surface. The plurality of stacked laminas can be secured together to prevent relative movement of any one of the plurality of stacked laminas with respect to another of the plurality of stacked laminas when a load is transmitted through the toothed parking gear from the at least one load-bearing surface.

The pivotable parking pawl can be engageable with the toothed parking gear for stopping rotational motion of the output load in an engaged position even if the vehicle is unattended. The pivotable parking pawl can be rotatable with respect to a pivot axis in response to movement of the actuator between the first position and the second position. The pivot axis of the parking pawl can be parallel to and offset from the axis of rotation of the toothed parking gear. The parking pawl can be pivotable between a disengaged position spaced from the toothed parking gear and an engaged position contacting the toothed parking gear. The parking pawl can be defined by a plurality of stacked laminas. Each of the plurality of stacked laminas can be rigid and have at least one peripherally extending surface. The at least one peripherally extending surface of at least two of the plurality of stacked laminas cooperate to define at least one load-bearing surface. The plurality of stacked laminas can be secured together to prevent relative movement of any one of the plurality of stacked laminas with respect to another of the plurality of stacked laminas when a load is transmitted through the parking pawl from the at least one load-bearing surface. At least one of the plurality of stacked laminas can have a different peripheral contour defining at least one chamfered load-bearing surface on the parking pawl. The at least one chamfered load-bearing surface on the parking pawl faces the actuator for engagement with the actuator during movement between the first position and the second position.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 2:
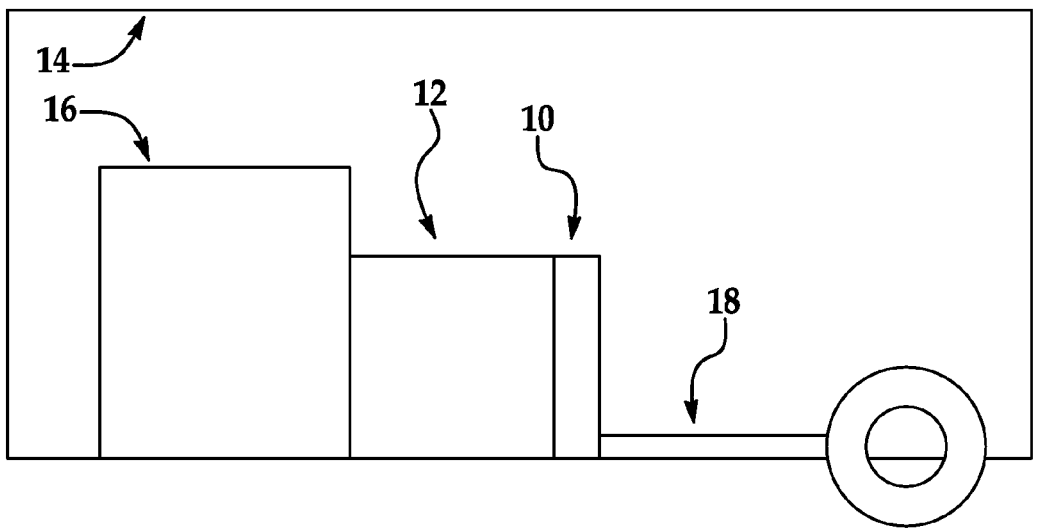
FIG. 2 is a simplified schematic diagram illustrating a motorized vehicle, a power source, a transmission, and an output load.

Referring briefly to FIG. 2, a parking brake 10 for a transmission 12 of a motorized vehicle 14 for transporting either passengers and/or cargo, where the transmission 12 receives rotary input torque from a power source 16 and transmits the rotary input torque to an output load shaft 18 to propel the vehicle 14. The parking brake 10 stops rotation of the output load shaft 18 and prevents movement of the vehicle 14, even if the vehicle 14 is unattended.

Figure 1:
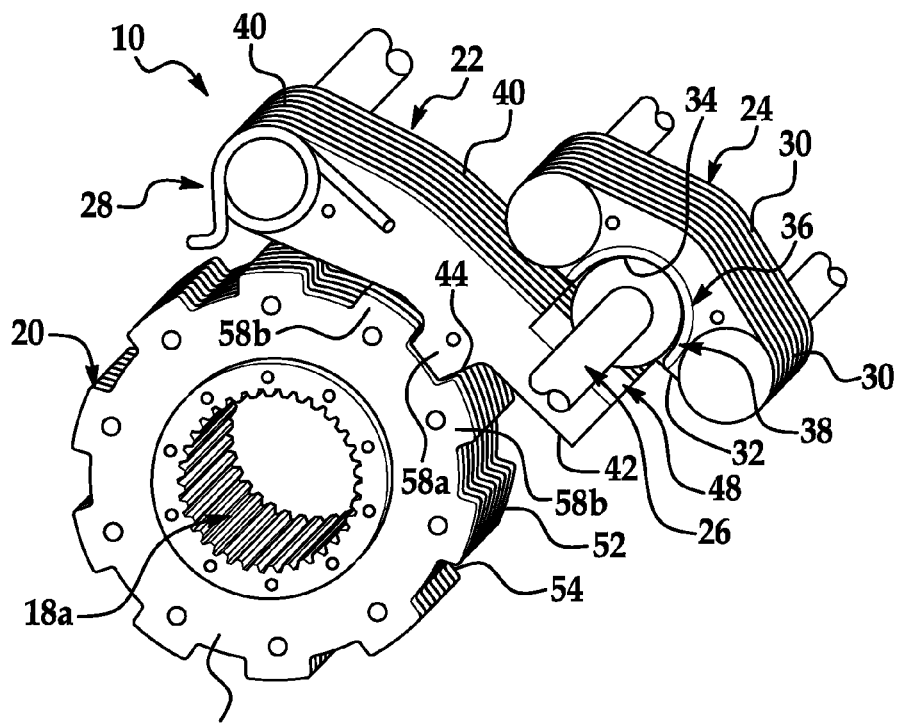
FIG. 1 is a perspective view of a parking brake including a toothed parking gear, a pivotable parking pawl engageable with the toothed parking gear, a parking anchor, and an actuator engageable with the anchor and the pawl.
Figure 3A:
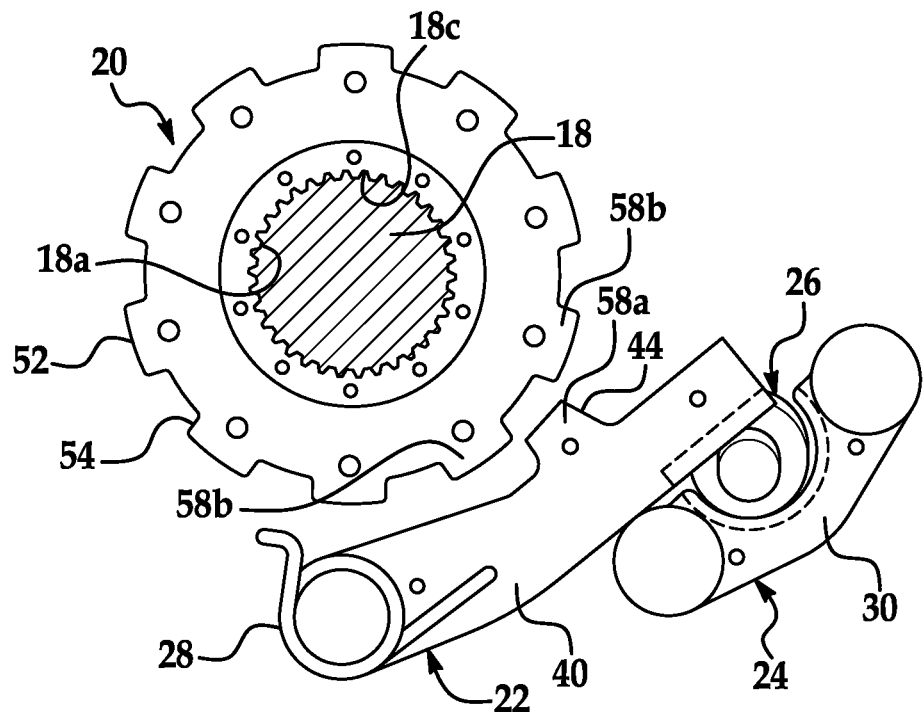
FIG. 3A is a detailed view of the actuator in a released position with the parking pawl biased to be spaced from the toothed parking gear.
Figure 3B:
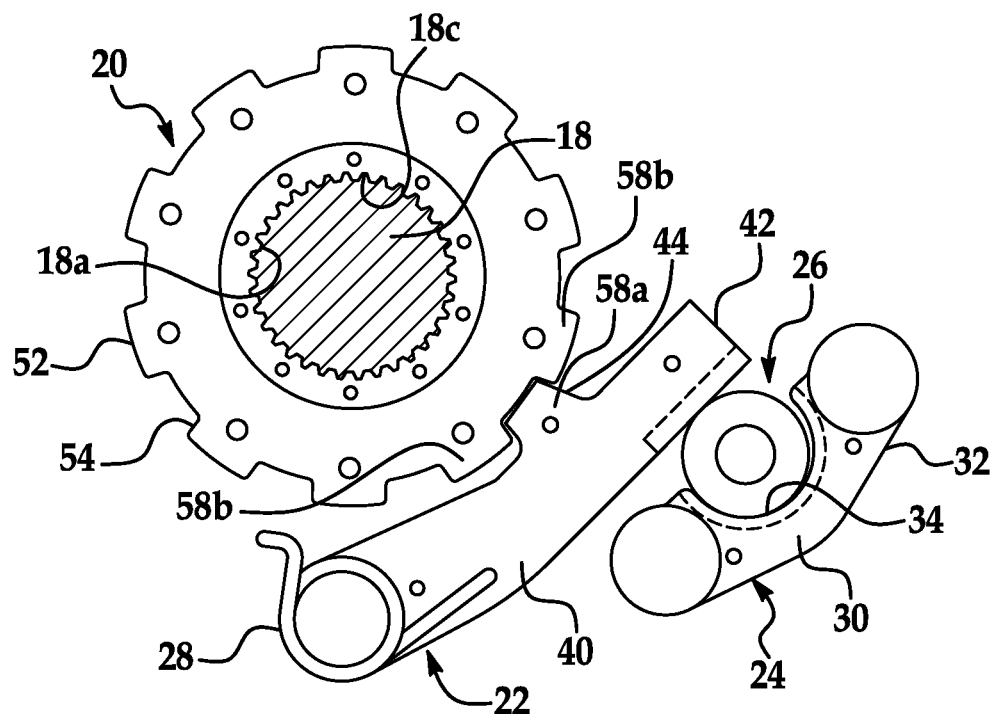
FIG. 3B is a detailed view of the actuator in an engaged position with the anchor and the parking pawl driven against the spring bias to be engaged with the toothed parking gear.
Figure 4A:
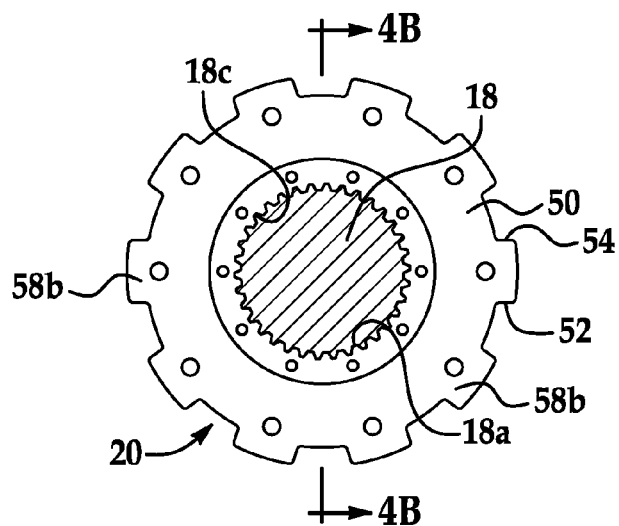
FIG. 4A is a detailed front view of the toothed parking gear.
Figure 4B:
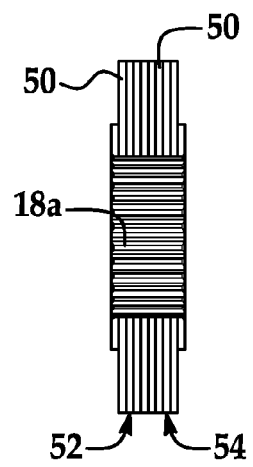
FIG. 4B is a detailed cross sectional view of the toothed parking gear taken as shown in FIG. 4A.
Figure 4C:
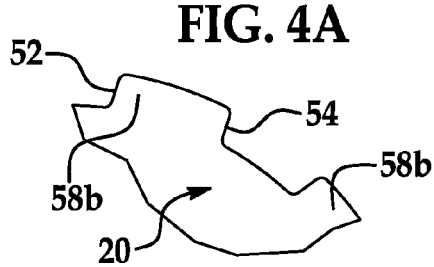
FIG. 4C is a is a detail view of a tooth of the toothed parking gear.

Referring now to FIG. 1, a parking brake 10 is shown in perspective view including a toothed parking gear 20 having an axis of rotation and an output load shaft receiving aperture 18a for connection to the output load shaft 18 (not shown in FIG. 1), a parking pawl 22, an anchor 24, an actuator 26 moveable between a first position and a second position, and a spring 28 for biasing the parking pawl 22 toward the disengaged position. The parking pawl 22 is engageable with the toothed parking gear 20 for stopping rotational motion of the output load shaft 18 when in an engaged position (best seen in FIGS. 1 and 3B), even if the vehicle 14 is unattended. The parking pawl 22 is rotatable with respect to a pivot axis in response to movement of the actuator 26 between the first position (best seen in FIGS. 1 and 3B) and the second position (best seen in FIG. 3A). The parking pawl 22 is pivotable between a disengaged position spaced from the toothed parking gear 20 (best seen in FIG. 3A) and the engaged position contacting the toothed parking gear 20 (best seen in FIGS. 1 and 3B). The pivot axis of the parking pawl 22 can be parallel to and offset from the axis of rotation of the toothed parking gear 20.

The anchor 24 is located to support the actuator 26 interposed between the anchor 24 and the parking pawl 22, when the parking pawl 22 is in the engaged position with the toothed parking gear 20. The anchor 24 is defined by a plurality of stacked laminas 30. Each of the plurality of stacked laminas 30 is rigid and has at least one peripherally extending surface 32. The at least one peripherally extending surface 32 of at least two of the plurality of stacked laminas 30 cooperate to define at least one load-bearing surface 34. The plurality of stacked laminas 30 are secured together to prevent relative movement of any one of the plurality of stacked laminas 30 with respect to another of the plurality of stacked laminas 30 when a load is transmitted through the anchor 24 from the at least one load-bearing surface 34.

Figure 5A:
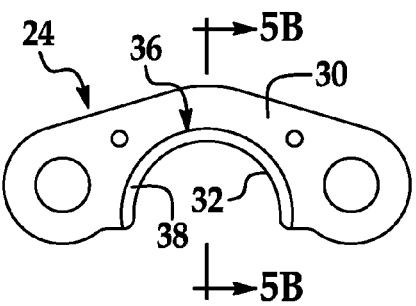
FIG. 5A is a detailed front view of the parking anchor with chamfered peripheral surface.
Figure 5B:
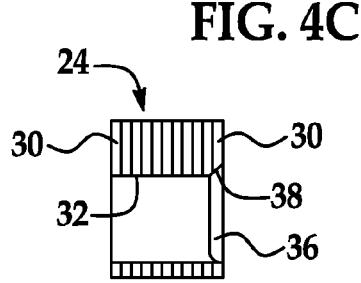
FIG. 5B is a detailed cross sectional view of the parking anchor with chamfered peripheral surface taken as shown in FIG. 5A.

Referring briefly to FIGS. 5A and 5B, at least one of the plurality of stacked laminas 30 can have a different peripheral contour 36 defining at least one chamfered load-bearing surface 38 on the anchor 24. Referring again to FIG. 1, the at least one chamfered load-bearing surface 38 on the anchor 24 can be facing the actuator 26 for engagement with the actuator 26 during movement between the first position and the second position.

The parking pawl 22 can be defined by a plurality of stacked laminas 40. Each of the plurality of stacked laminas 40 is rigid and has at least one peripherally extending surface 42. The at least one peripherally extending surface 42 of at least two of the plurality of stacked laminas 40 cooperate to define at least one load-bearing surface 44. The plurality of stacked laminas 40 are secured together to prevent relative movement of any one of the plurality of stacked laminas 40 with respect to another of the plurality of stacked laminas 40 when a load is transmitted through the parking pawl 22 from the at least one load bearing surface 44.

Figure 6A:
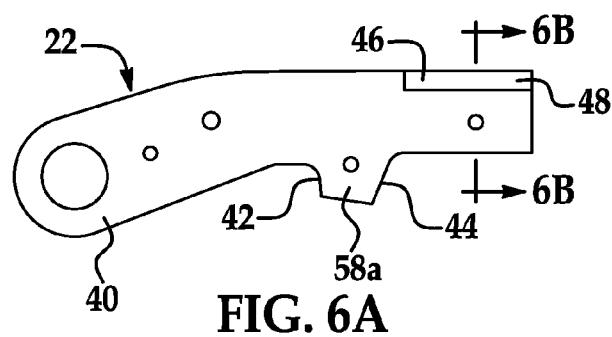
FIG. 6A is a detailed front view of the parking pawl with chamfered peripheral surface.
Figure 6B:
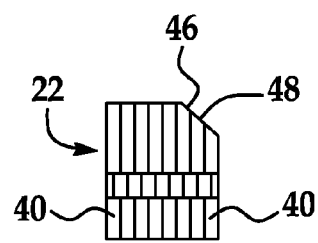
FIG. 6B is a detailed cross sectional view of the parking pawl with chamfered peripheral surface taken as shown in FIG. 6A.
Figure 6C:
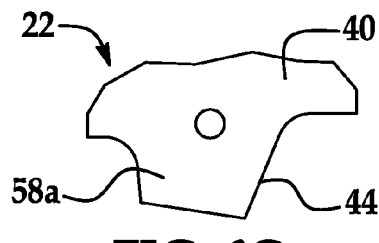
FIG. 6C is a detail view of a tooth of the parking pawl.

Referring briefly to FIGS. 6A-6C, at least one of the plurality of stacked laminas 40 has a different peripheral contour 46 defining at least one chamfered load-bearing surface 48 on the parking pawl 22. Referring again to FIG. 1, the at least one chamfered load-bearing surface 48 on the parking pawl 22 can be facing the actuator 26 for engagement with the actuator 26 during movement between the first position and the second position.

Referring briefly to FIGS. 1 and 4A-4C, the toothed parking gear 20 can be defined by a plurality of stacked laminas 50. Each of the plurality of stacked laminas 50 is rigid and has at least one peripherally extending surface 52. The at least one peripherally extending surface 52 of at least two of the plurality of stacked laminas 50 cooperate to define a load-bearing surface 54. The plurality of stacked laminas 50 are secured together to prevent relative movement of any one of the plurality of stacked laminas 50 with respect to another of the plurality of stacked laminas 50 when a load is transmitted through the toothed parking gear 20 from the load-bearing surface 54.

In operation, the toothed parking gear 20 is fixedly connected non-rotationally with respect to the output load shaft 18, such as through complementary splines 18a formed at the interface 18c between the gear 20 and shaft 18. The parking pawl 22 is normally held in a disengaged position by spring 28 until acted on by actuator 26. The actuator 26 is moveable between a first position, corresponding to the parking pawl 22 in the disengaged position, and a second position, corresponding to the parking pawl 22 in the engaged position. As the actuator 26 moves between the first and second positions, load-bearing surfaces 34, 44 of the anchor 24 and parking pawl 22 respectively are engaged with the actuator 26 driving the parking pawl 22 in rotation between the disengaged position and the engaged position with respect to the toothed parking gear 20. When in the engaged position, a tooth 58a (best seen in FIGS. 1, 3A, 3B, 6A, and 6C) of the parking pawl 22 engages between adjacent teeth 58b (best seen in FIGS. 1, 3A, 3B, 4A, and 4C) of the toothed parking gear 20. The actuator 26 is interposed between the anchor 24 and parking pawl 22 to maintain the parking pawl 22 in the engaged position working against the urging of spring 28. The interaction of tooth 58a of the parking pawl 22 in the engaged position with the adjacent teeth 58b of the toothed parking gear 20 prevents rotation of the output load shaft 18, even if the vehicle 14 is unattended. When the actuator 26 is moved from the second position to the first position, the spring 28 urges the parking pawl 22 toward the disengaged position moving the tooth 58a of the parking pawl 22 to a position spaced from the teeth 58b of the toothed parking gear 20 allowing the output load shaft 18 to freely rotate.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a parking brake (10) for a transmission (12) of a motorized vehicle (14) for transporting at least one of passenger and cargo, where the transmission (12) receives rotary input torque from a power source (16) and transmits the rotary input torque to an output load (18) to propel the vehicle (14), and the parking brake (10) stops rotation of the output load (18) and prevents movement of the vehicle (14), the improvement comprising:

an actuator (26) movable between a first position and a second position;

a toothed parking gear (20) connected to the output load (18) and having an axis of rotation;

a pivotable parking pawl (22) engageable with the toothed parking gear (20) for stopping rotational motion of the output load (18) in an engaged position even if the vehicle is unattended, the pivotable parking pawl (22) rotatable with respect to a pivot axis in response to movement of the actuator (26) between the first position and the second position, the parking pawl (22) pivotable between a disengaged position spaced from the toothed parking gear (20) and the engaged position contacting the toothed parking gear (20); and a stationary anchor (24) separate from the actuator and spaced from the actuator (26) when in the second position, while being located to support the actuator (26) interposed between the anchor (24) and the parking pawl (22) when the actuator (26) is in the first position driving the parking pawl (22) into the engaged position with the toothed parking gear (20), the anchor (24) defined by a plurality of stacked laminas (30), each of the plurality of stacked laminas (30) being rigid and having at least one peripherally extending surface (32), wherein the at least one peripherally extending surface (32) of at least two of the plurality of stacked laminas (30) cooperate to define at least one load-bearing surface (34) engaging the actuator (26) when in the first position, and wherein the plurality of stacked laminas (30) are secured together to prevent relative movement of any one of the plurality of stacked laminas (30) with respect to another of the plurality of stacked laminas (30) when a load is transmitted through the anchor (24) from the at least one load-bearing surface (34).

2. The improvement of claim 1 further comprising:
at least one of the plurality of stacked laminas (30) having a different peripheral contour (36) defining at least one chamfered load-bearing surface (38) on the anchor (24).

3. The improvement of claim 2 further comprising:
the at least one chamfered load-bearing surface (38) on the anchor (24) facing the actuator (26) for engagement with the actuator (26) during movement between the first position and the second position.

4. The improvement of claim 1 further comprising:
the parking pawl (22) defined by a plurality of stacked laminas (40), each of the plurality of stacked laminas (40) being rigid and having at least one peripherally extending surface (42), where the at least one peripherally extending surface (42) of at least two of the plurality of stacked laminas (40) cooperate to define at least one load-bearing surface (44), where the plurality of stacked laminas (40) are secured together to prevent relative movement of any one of the plurality of stacked laminas (40) with respect to another of the plurality of stacked laminas (40) when a load is transmitted through the parking pawl (22) from the at least one load bearing surface (44).

5. The improvement of claim 4 further comprising:
at least one of the plurality of stacked laminas (40) having a different peripheral contour (46) defining at least one chamfered load-bearing surface (48) on the parking pawl (22).

6. The improvement of claim 5 further comprising:
the at least one chamfered load-bearing surface (48) on the parking pawl (22) facing the actuator (26) for engagement with the actuator (26) during movement between the first position and the second position.

7. The improvement of claim 1 further comprising:
the pivot axis of the parking pawl (22) being parallel to and offset from the axis of rotation of the toothed parking gear (20).

8. The improvement of claim 1 further comprising:
a spring (28) biasing the pivotable parking pawl (22) normally toward the disengaged position.

9. The improvement of claim 1 further comprising:
the toothed parking gear (20) defined by a plurality of stacked laminas (50), each of the plurality of stacked laminas (50) being rigid and having at least one peripherally extending surface (52), where the at least one peripherally extending surface (52) of at least two of the plurality of stacked laminas (50) cooperate to define a load-bearing surface (54), and where the plurality of stacked laminas (50) are secured together to prevent relative movement of any one of the plurality of stacked laminas (50) with respect to another of the plurality of stacked laminas (50) when a load is transmitted through the toothed parking gear (20) from the load-bearing surface (54).

10. In a parking brake (10) for a transmission (12) of a motorized vehicle (14) for transporting at least one of passenger and cargo, where the transmission (12) receives rotary input torque from a power source (16) and transmits the rotary input torque to an output load (18) to propel the vehicle (14), and the parking brake (10) stops rotation of the output load (18) and prevents movement of the vehicle (14), the improvement comprising:
an actuator (26) movable between a first position and a second position;
a toothed parking gear (20) connected to the output load (18) and having an axis of rotation, the toothed parking gear (20) defined by a plurality of stacked laminas (50), each of the plurality of stacked laminas (50) being rigid and having at least one peripherally extending surface (52), where the at least one peripherally extending surface (52) of at least two of the plurality of stacked laminas (50) cooperate to define at least one load-bearing surface (54), and where the plurality of stacked laminas (50) are secured together to prevent relative movement of any one of the plurality of stacked laminas (50) with respect to another of the plurality of stacked laminas (50) when a load is transmitted through the toothed parking gear (20) from the at least one load-bearing surface (54); and
a pivotable parking pawl (22) engageable with the toothed parking gear (20) for stopping rotational motion of the output load (18) in an engaged position even if the vehicle (14) is unattended, the pivotable parking pawl (22) rotatable with respect to a pivot axis in response to movement of the actuator (26) between the first position and the second position, the pivot axis of the parking pawl (22) being parallel to and offset from the axis of rotation of the toothed parking gear (20), the parking pawl (22) pivotable between a disengaged position spaced from the toothed parking gear (20) and an engaged position contacting the toothed parking gear (20), the parking pawl (22) defined by a plurality of stacked laminas (40), each of the plurality of stacked laminas (40) being rigid and having at least one peripherally extending surface (42), where the at least one peripherally extending surface (42) of at least two of the plurality of stacked laminas (40) cooperate to define at least one load-bearing surface (44) engaging the at least one load bearing surface (54) of the toothed parking gear (20), where the plurality of stacked laminas (40) are secured together to prevent relative movement of any one of the plurality of stacked laminas (40) with respect to another of the plurality of stacked laminas (40) when a load is transmitted through the parking pawl (22) from the at least one load-bearing surface (44), at least one of the plurality of stacked laminas (40) having a different peripheral contour (46) defining at least one chamfered load-bearing surface (48) on the stacked laminas (40) of the parking pawl (22), the at least one chamfered load-bearing surface (48) on the parking pawl (22) facing the actuator (26) for engagement with the actuator (26) during movement between the first position and the second position; and
an anchor (24) located to support the actuator (26) interposed between the anchor (24) and the parking pawl (22) when the parking pawl (22) is in the engaged position with the toothed parking gear (20), the anchor (24) defined by a plurality of stacked laminas (30), each of the plurality of stacked laminas (30) being rigid and having at least one peripherally extending surface (32), wherein the at least one peripherally extending surface (32) of at least two of the plurality of stacked laminas (30) cooperate to define at least one load-bearing surface (34) engaging the actuator (26), and wherein the plurality of stacked laminas (30) are secured together to prevent relative movement of any one of the plurality of stacked laminas (30) with respect to another of the plurality of stacked laminas (30) when a load is transmitted through the parking pawl (22) from the at least one load-bearing surface (34).

11. The improvement of claim 10 further comprising:
at least one of the plurality of stacked laminas (30) having a different peripheral contour (36) defining at least one chamfered load-bearing surface (38) on the anchor (24).

12. The improvement of claim 11 further comprising:
the at least one chamfered load-bearing surface (38) on the anchor (24) facing the actuator (26) for engagement with the actuator (26) during movement between the first position and the second position.

13. The improvement of claim 12 further comprising:
a spring (28) biasing the pivotable parking pawl (22) normally toward the disengaged position.

* * * * *